(12) United States Patent
Watanabe et al.

(10) Patent No.: US 7,734,358 B2
(45) Date of Patent: Jun. 8, 2010

(54) DATA PROCESSING APPARATUS FOR ARC WELDING

(75) Inventors: Atsushi Watanabe, Tokyo (JP); Yoshiharu Nagatsuka, Yamanashi (JP); Toshiya Takeda, Yamanashi (JP)

(73) Assignee: Fanuc Ltd, Minamitsuru-gun, Yamanashi (JP)

( * ) Notice: Subject to any disclaimer, the term of this patent is extended or adjusted under 35 U.S.C. 154(b) by 1287 days.

(21) Appl. No.: 11/185,730

(22) Filed: Jul. 21, 2005

(65) Prior Publication Data

US 2006/0030970 A1    Feb. 9, 2006

(30) Foreign Application Priority Data

Jul. 23, 2004    (JP)    ............................. 2004-216467

(51) Int. Cl.
*G06F 19/00*    (2006.01)
*G06F 15/18*    (2006.01)

(52) U.S. Cl. ........................... 700/61; 700/65; 700/186; 700/247; 700/253; 700/257; 901/2; 901/42; 318/568.15; 318/568.25

(58) Field of Classification Search ................. 700/247, 700/262, 248, 263
See application file for complete search history.

(56) References Cited

U.S. PATENT DOCUMENTS

| | | | | |
|---|---|---|---|---|
| 4,380,696 A * | 4/1983 | Masaki | ................... | 219/124.34 |
| 4,541,062 A * | 9/1985 | Kada et al. | ................... | 700/247 |
| 4,833,381 A * | 5/1989 | Taft et al. | ..................... | 318/577 |
| 5,243,266 A * | 9/1993 | Kasagami et al. | ......... | 318/568.1 |
| 5,315,222 A * | 5/1994 | Kasagami et al. | ...... | 318/568.11 |
| 5,353,386 A * | 10/1994 | Kasagami et al. | ........... | 700/247 |
| 5,845,053 A * | 12/1998 | Watanabe et al. | ........... | 700/262 |
| 6,157,873 A * | 12/2000 | DeCamp et al. | ............. | 700/253 |
| 6,522,949 B1 * | 2/2003 | Ikeda et al. | ................. | 700/245 |
| 6,836,702 B1 * | 12/2004 | Brogårdh et al. | ............ | 700/245 |
| 7,298,385 B2 * | 11/2007 | Kazi et al. | ................... | 345/633 |
| 7,376,488 B2 * | 5/2008 | Watanabe et al. | ........... | 700/264 |
| 2005/0251290 A1 * | 11/2005 | Skourup et al. | ............. | 700/245 |

* cited by examiner

*Primary Examiner*—Thomas G Black
*Assistant Examiner*—Lin B Olsen
(74) *Attorney, Agent, or Firm*—Drinker Biddle & Reath LLP (57) ABSTRACT

A data processing apparatus for processing data described in a welding operation program of an arc welding robot system. The data processing apparatus includes a data obtaining section for obtaining a plurality of position and orientation data at a plurality of different teaching points previously taught and included in the welding operation program; a reference plane setting section for setting a virtual reference plane as a reference defining a geometric placement of an arc welding torch relative to a workpiece during a welding operation, based on the position and orientation data obtained in the data obtaining section; an angle calculating section for calculating a plurality of angle data representing the geometric placement of the arc welding torch at every teaching points, by using the position and orientation data obtained in the data obtaining section and the virtual reference plane set in the reference plane setting section; and an angle processing section for performing at least one of a displaying process and a correcting process of the angle data calculated in the angle calculating section.

10 Claims, 12 Drawing Sheets

| | WORK ANGLE | TRAVEL ANGLE |
|---|---|---|
| P[2] | 44.562 | 9.859 |
| P[3] | 44.717 | 9.832 |
| P[4] | 44.558 | 9.851 |
| P[5] | 44.554 | 9.852 |
| P[6] | 21.549 | 43.514 |

12: AXIS-MODE POSITION[1]100% POSITIONING
13: AXIS-MODE POSITION[2]100% POSITIONING
14: ARC-MODE POSITION[3] : POSITION[4]50mm/sec SMOOTH 100
15: ARC-MODE POSITION[5] : POSITION[6]50mm/sec POSITIONING
16: LINEAR-MODE POSITION[7] : 2000mm/sec POSITIONING

DATA PROCESSING APPARATUS FOR ARC WELDING

BACKGROUND OF THE INVENTION

1. Field of the Invention

The present invention relates to a data processing apparatus for arc welding.

2. Description of the Related Art

A robot system in which an arc welding torch is mounted on an arm end portion of a robot to perform arc welding is known. In this type of arc welding robot system, one typical technique for teaching the robot a welding operation is a so-called playback teaching technique. In the playback teaching technique, generally, the actual robot is operated by jog-feeding in a manual mode, to move the welding torch along a welding line on a workpiece, and to make the robot store the position and orientation of the arm at several predetermined teaching points. The orientation of the arm is set in such a manner that the welding torch appropriately exhibits a target angle (or a work angle (JIS)) and a lead angle (or a travel angle (JIS)) relative to the welding line at each teaching point. The robot executes a welding operation program describing the position and orientation data at the teaching points, so as to perform the welding work. It should be noted that both the "work angle" and the "travel angle" are angle data representing the geometric placement of the arc welding torch with respect to the workpiece (or the welding line) during the welding operation, which will be described, later, in more detail.

Another typical teaching technique uses an off-line programming system. In the off-line programming system, information about the robot, welding torch, workpiece, surrounding objects and so on, is given by an off-line location (i.e., at a location away from the actual operating environment) to a processing apparatus, so that a work-cell is defined in the processing apparatus on the basis of the information. The work-cell is composed of the reconstruction of an actual job site in a virtual space. The position and orientation data of the robot at the teaching points, which must be described in the welding operation program, are determined based on the position and orientation taken by the virtual robot operating in the work-cell. The orientation of the robot is also determined in such a manner that the virtual welding torch defined in the work-cell exhibits appropriate work and travel angles with respect to the virtual workpiece. Then, the welding operation program describing the position and orientation data at the teaching points is transferred to a robot controller, to control the actual robot, so as to perform the welding work.

In the playback teaching technique described above, the position and orientation of the arm are adjusted visually while the actual robot is operated by jog-feeding, so that it is generally difficult to perform the appropriate teaching in a short time and a skilled operator is required. In particular, in order to accurately set the work angle and the travel angle, which are important conditions influencing the welding quality, there is a problem in that the operation, including jog-feeding, teaching and program executing, should be done by repeated trial and error, and the number of processing steps are thus increased significantly.

On the other hand, in the off-line programming teaching technique described above, an error typically exists between an equipment layout defined in the work-cell in the processing apparatus and an actual equipment layout, so that, when the welding operation program provided in an off-line mode is actually executed at the job site, the welding operation program often cannot be used in its original form. Therefore, in this case, the position and orientation data at the teaching points have to be corrected as required. However, because the work angle and travel angle are changed due to the data correction, it is also necessary to perform the programming work by repeated trial and error. As a result, the problem of the increased number of processing steps cannot be solved in the off-line programming teaching technique, just as in the playback teaching technique.

One of the reasons for the above-described problems in conventional teaching techniques is that, in the conventional programming work, welding conditions including the work angle and the travel angle cannot be described directly in the welding operation program. Further, the operator can grasp directly the position and orientation of the robot at the teaching points from the welding operation program, but cannot grasp the work angle and travel angle of the welding torch, corresponding to the position and orientation at the teaching points, unless the operator calculates, as another step, the work angle and the travel angle from the position and orientation data. Therefore, for example, even if optimal welding conditions including the work angle and the travel angle are previously recognized, it is necessary for the operator to calculate the position and orientation data of the robot on the basis of the optimal welding conditions, and to provide or correct the welding operation program by using the calculated position and orientation data. Thus, in the conventional arc welding robot system, there is a problem in that a significant time is consumed for the provision and the correction of the welding operation program.

SUMMARY OF THE INVENTION

It is an object of the present invention to solve the above-described problems in the conventional arc welding robot system.

It is another object of the present invention to provide a data processing apparatus, for processing data described in a welding operation program of an arc welding robot system, in which it is possible for an operator to easily and directly grasp angle data as one of the welding conditions provided for an arc welding torch.

It is yet another object of the present invention to provide a data processing apparatus, for processing data described in a welding operation program of an arc welding robot system, in which it is possible for an operator to easily and directly correct angle data as one of the welding conditions of an arc welding torch.

In order to accomplish the above objects, the present invention provides a data processing apparatus, for processing data described in a welding operation program of an arc welding robot system, comprising a data obtaining section for obtaining a plurality of position and orientation data at a plurality of different teaching points previously taught and included in the welding operation program; a reference plane setting section for setting a virtual reference plane as a reference defining a geometric placement of an arc welding torch relative to a workpiece during a welding operation, based on the plurality of position and orientation data obtained in the data obtaining section; an angle calculating section for calculating a plurality of angle data representing the geometric placement of the arc welding torch at every teaching point, by using the plurality of position and orientation data obtained in the data obtaining section and the virtual reference plane set in the reference plane setting section; and an angle processing section for performing at least one of a displaying process and a correcting process on the plurality of angle data calculated in the angle calculating section.

In the data processing apparatus described above, the angle processing section may include a data display section for displaying the plurality of angle data at the plurality of teaching points.

Alternatively, the angle processing section may include a correction instructing section for instructing a correction of desired angle data among the plurality of angle data; and a data correcting section for correcting, according to an instruction of the correction instructing section, position and orientation data corresponding to the desired angle data instructed in the correction instructing section among the plurality of position and orientation data obtained in the data obtaining section.

BRIEF DESCRIPTION OF THE DRAWINGS

The above and other objects, features and advantages of the present invention will be more apparent from the following description of preferred embodiments in conjunction with the accompanying drawings, in which.

DETAILED DESCRIPTION

The embodiments of the present invention are described below, in detail, with reference to the accompanying drawings. In the drawings, the same or similar components are denoted by common reference numerals.

Figure 1:
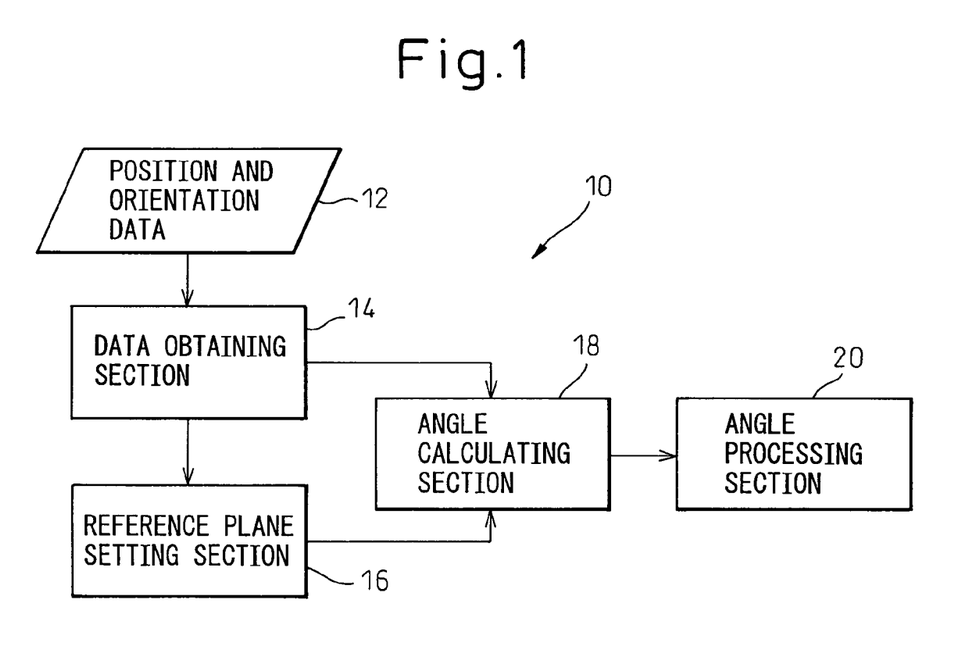
FIG. 1 is a functional block diagram showing a basic configuration of a data processing apparatus according to the present invention.

Referring to the drawings, FIG. 1 shows, as a functional block diagram, a basic configuration of a data processing apparatus 10 according to the present invention. The data processing apparatus 10 has a configuration for processing data described in a welding operation program of an arc welding robot system, and includes a data obtaining section 14 for obtaining a plurality of position and orientation data 12 at a plurality of different teaching points previously taught and included in the welding operation program; a reference plane setting section 16 for setting a virtual reference plane as a reference defining geometric placement of an arc welding torch relative to a workpiece during a welding operation, based on the plurality of position and orientation data 12 obtained in the data obtaining section 14; an angle calculating section 18 for calculating a plurality of angle data representing the geometric placement of the arc welding torch at every teaching points, by using the plurality of position and orientation data 12 obtained in the data obtaining section 14 and the virtual reference plane set in the reference plane setting section 16; and an angle processing section 20 for performing at least one of a displaying process and a correcting process, of the plurality of angle data calculated in the angle calculating section 18.

According to the data processing apparatus 10 configured as described above, it is possible for an operator, due to the data displaying function of the angle processing section 20, to easily and directly understand the angle data as welding conditions corresponding to the teachings at respective teaching points in the welding operation program. Further, it is possible for an operator, due to the data correcting function of the angle processing section 20, to easily and directly correct the angle data. As a result, time required for the provision, the check of validation, the on-site correction, and so on, of the welding operation program of the arc welding robot system can be reduced and, therefore, a burden on the operator can be significantly reduced due to the reduced number of processing steps.

FIGS. 2A to 2E show, as functional block diagrams, various embodiments of the data processing apparatus 10 of FIG. 1. In these embodiments, components corresponding to those of the data processing apparatus 10 of FIG. 1 are denoted by like reference numerals, and the descriptions thereof are not repeated.

Figure 2A:
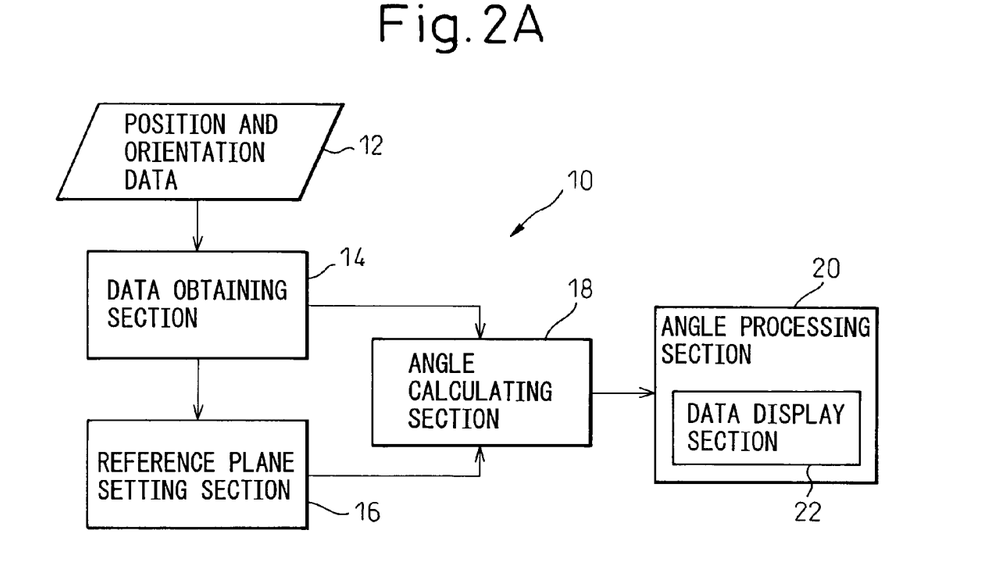
FIGS. 2A to 2E are functional block diagrams showing various embodiments of the data processing apparatus of FIG. 1.

As shown in FIG. 2A, the angle processing section 20 may include a data display section 22 for displaying the plurality of angle data calculated by the angle calculating section 18 at every teaching points included in the welding operation program.

Figure 2B:
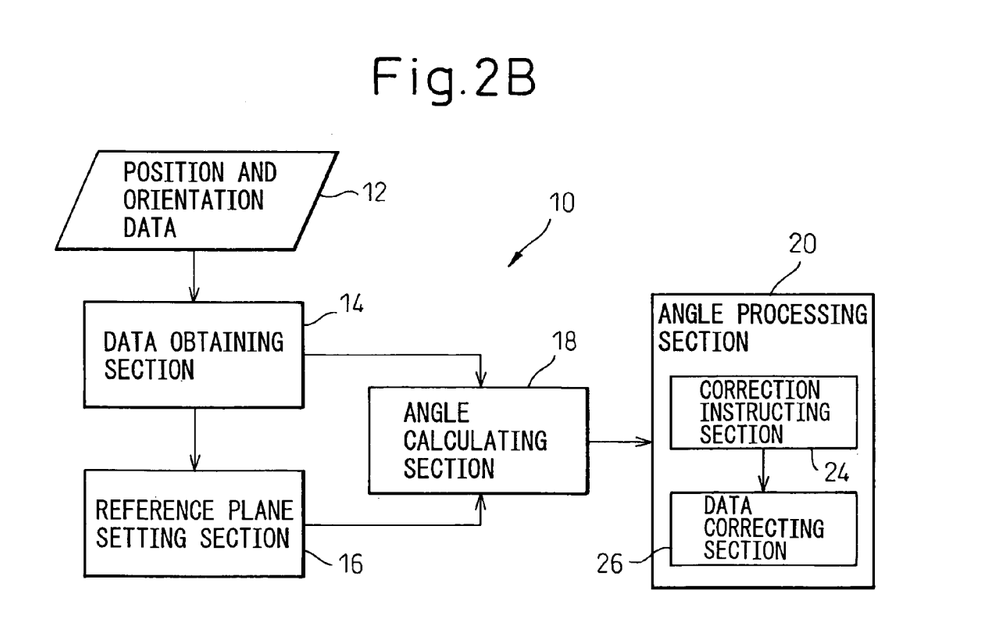

Alternatively, as shown in FIG. 2B, the angle processing section 20 may include a correction instructing section 24 for instructing the correction of desired angle data among the plurality of angle data calculated by the angle calculating section 18, and a data correcting section 26 for correcting, according to the instruction of the correction instructing section 24, the position and orientation data corresponding to the desired angle data instructed in the correction instructing section 24 among the plurality of position and orientation data 12 obtained in the data obtaining section 14.

Figure 2C:
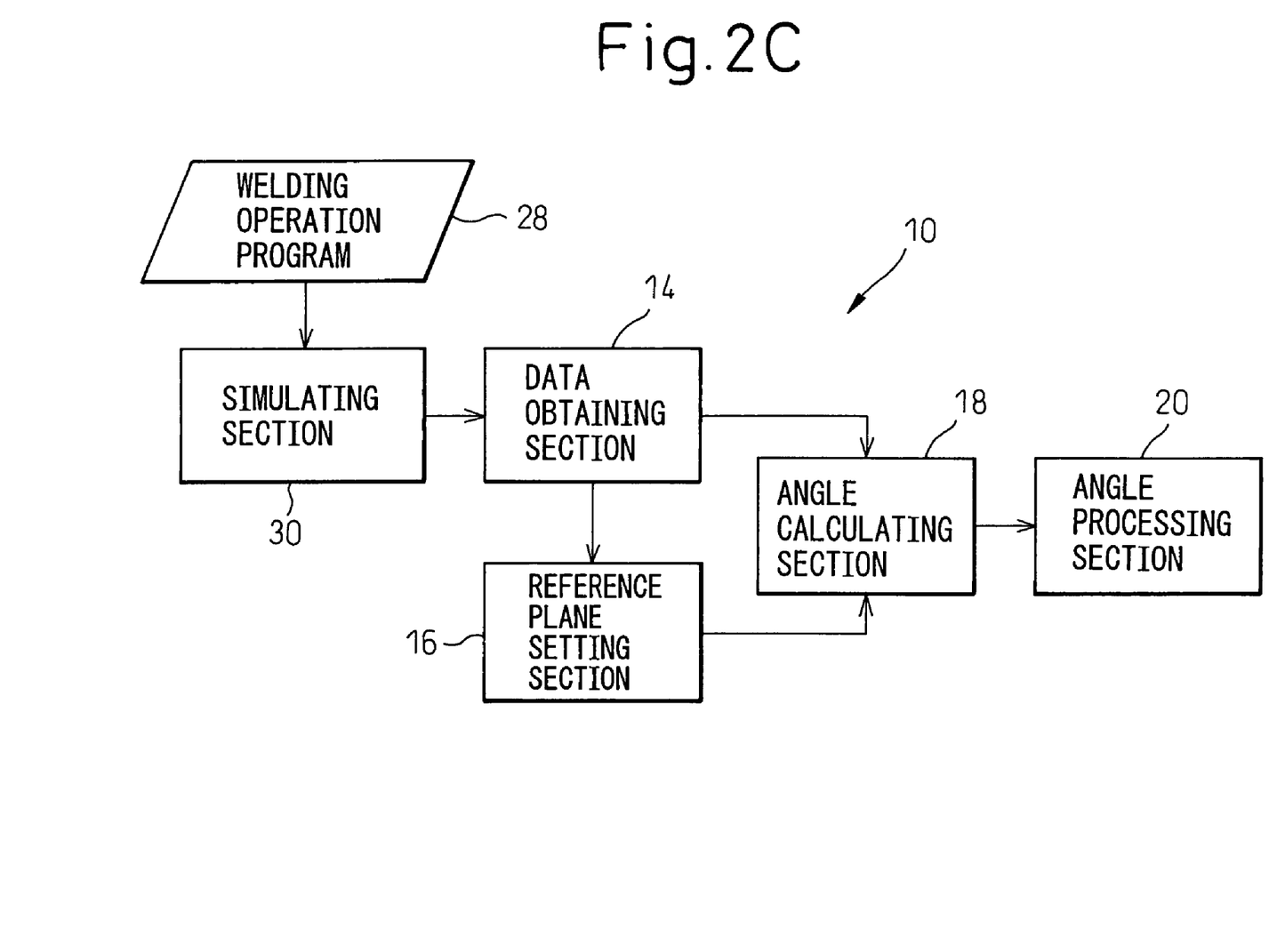

Also, as shown in FIG. 2C, the data processing apparatus 10 may further include a simulating section 30 for simulating the welding operation program 28. In this configuration, the data obtaining section 14 obtains the plurality of position and orientation data at a predetermined period from the welding operation program 28 during the simulation of the welding operation program 28 in the simulating section 30. Further, the angle calculating section 18 calculates the plurality of angle data at the predetermined period by using the plurality of position and orientation data obtained at the predetermined period in the data obtaining section 14 and the virtual reference plane set in the reference plane setting section 16.

Figure 2D:
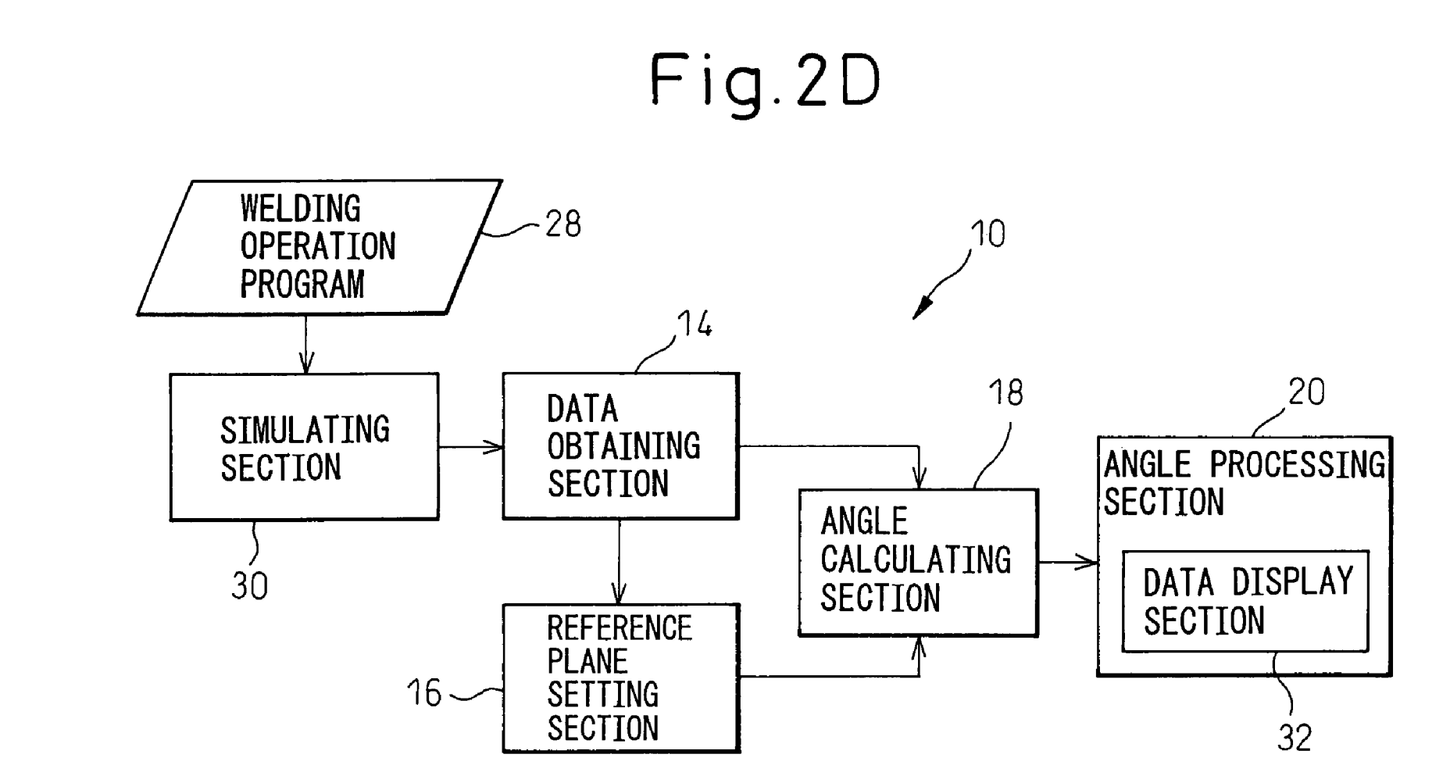

In the configuration described above, the angle processing section 20 may include a data display section 32 for displaying, graphically along a time axis, the plurality of angle data calculated in the angle calculating section 18 in the predetermined period (see FIG. 2D.)

In this case, the data display section 32 may receive a time indication indicating a desired portion, along the time axis, of the plurality of angle data as displayed graphically, and displays the contents described in the operation command lines of the welding operation program 28 corresponding to the desired portion indicated by the time indication.

Figure 2E:
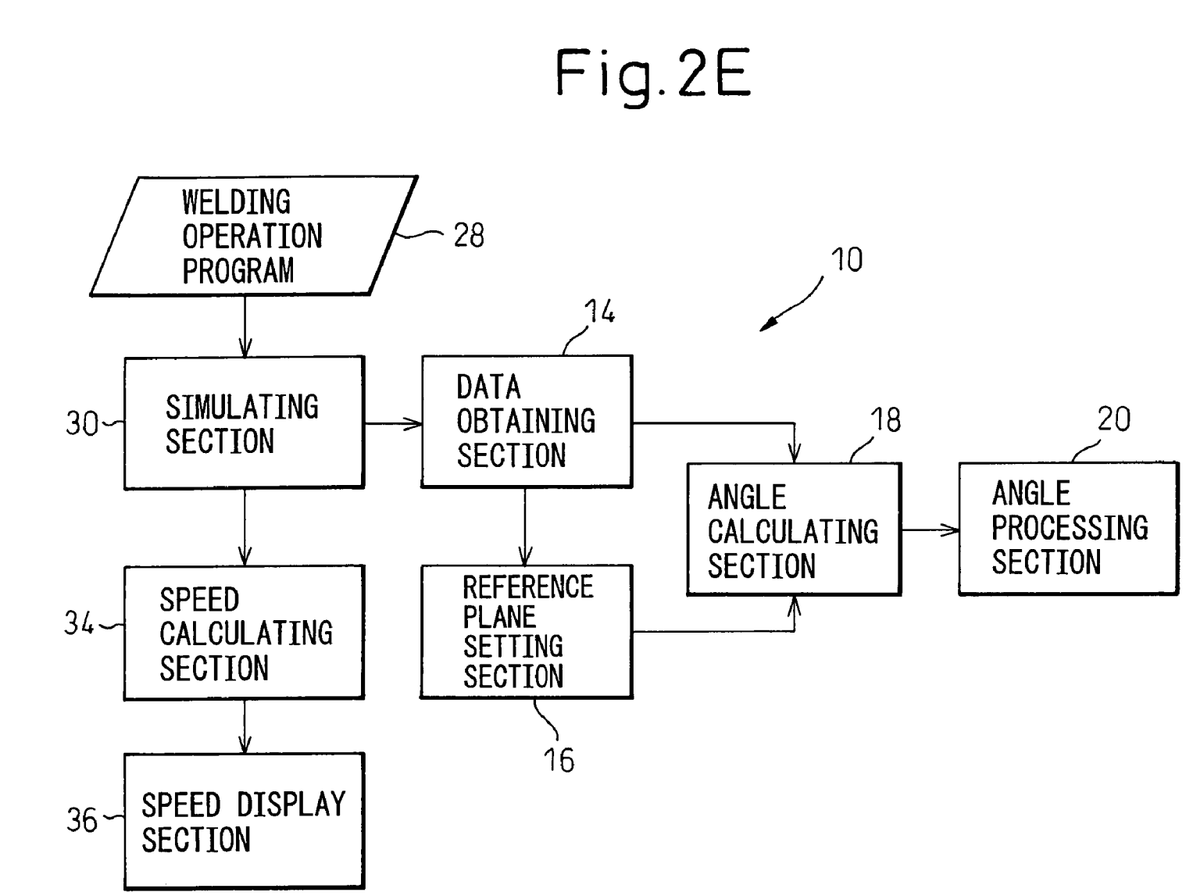

Alternatively, as shown in FIG. 2E, the data processing apparatus 10 may further include a speed calculating section 34 for calculating a moving speed of the arc welding torch relative to the workpiece during the welding operation, on the basis of the plurality of position and orientation data obtained in the data obtaining section 14 at the predetermined period and time data representing the predetermined period, and a speed display section 36 for displaying, graphically along a time axis, the moving speed calculated in the speed calculating section 34.

Figure 3:
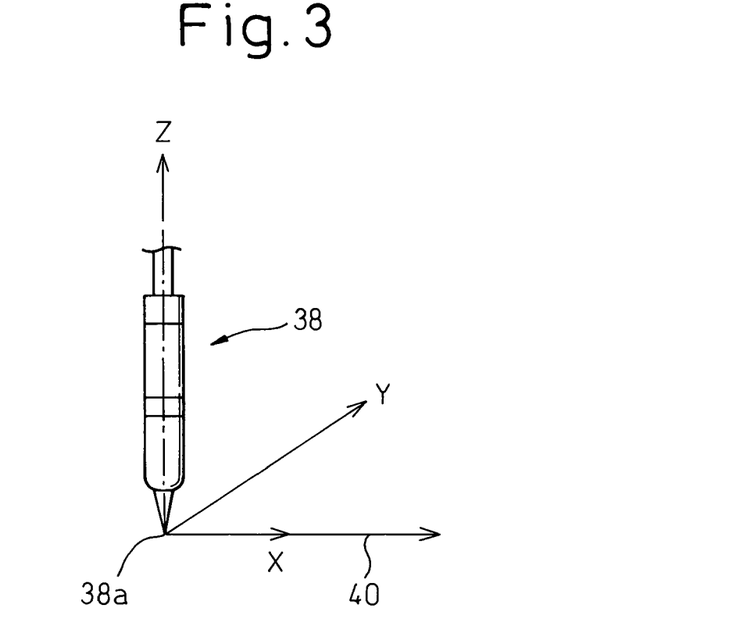
FIG. 3 is a diagram showing a positional correlation between an arc welding torch and a tool coordinate system established in an arc welding robot system.

FIG. 3 shows a positional correlation between an arc welding torch and a tool coordinate system established in a common arc welding robot system. Generally, in the arc welding robot system, as shown in FIG. 3, a tool coordinate system is established, wherein a tip 38a of the arc welding torch 38 attached to the arm end portion of a robot is defined as an origin, the extending direction of the torch is conformed to a Z-axis, and the front-face direction of the torch is conformed to an X-axis. In this connection, the "front-face" of the torch means a portion of the outer circumferential surface of the welding torch 38, facing toward a weld-advancing direction 40. In the arc welding robot system having the data processing apparatus according to an embodiment of the present invention as described later, it is also assumed that a tool coordinate system is defined in the same way as described above.

Figure 4:
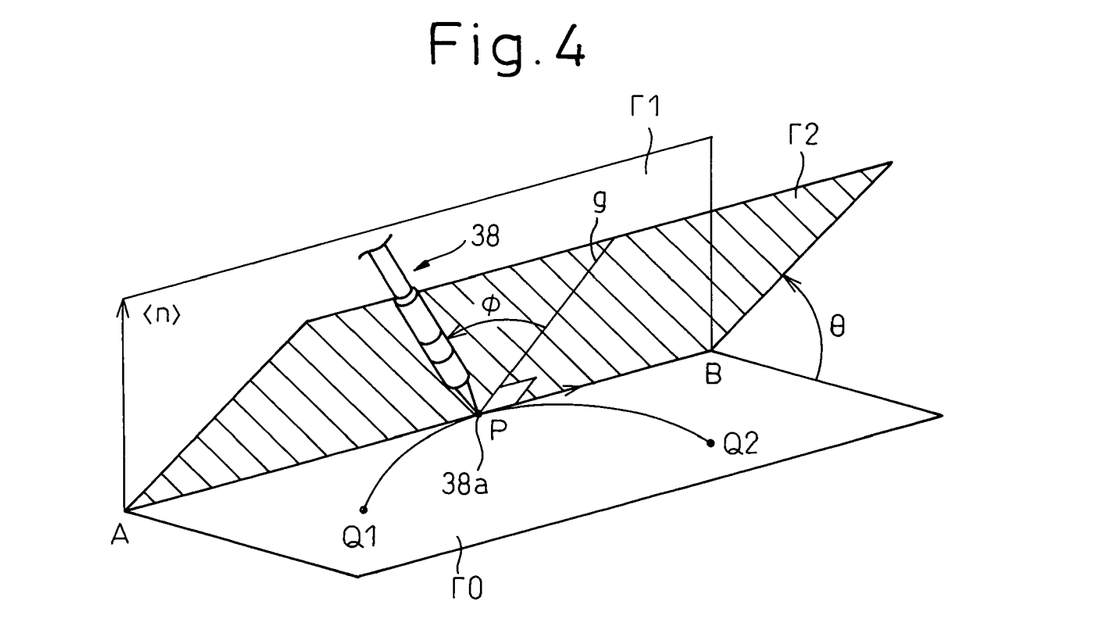
FIG. 4 is a diagram showing a common definition of a work angle and a travel angle, as welding conditions of an arc welding torch.

With reference to FIG. 4, a common definition of a "target angle" and a "travel angle", as angle data that is one of welding conditions of the arc welding torch, will be described. In FIG. 4, a straight line A-P-B illustrates, by way of example, a welding path of the torch tip along a straight welding line, and a circular arc Q1-P-Q2 illustrates, by way of example, a welding path of the torch tip along an arcuate welding line. In this connection, in order to set the work angle and travel angle, representing the geometric placement of the arc welding torch during the welding operation with respect to the workpiece, it is necessary to first define a virtual reference plane as a reference for the setting operation. In FIG. 4, the virtual reference plane is designated by the reference symbol Γ0. The virtual reference plane Γ0 is typically defined as follows:

(1) In the case of the arcuate welding path Q1-P-Q2, a plane including the path Q1-P-Q2 is defined as the virtual reference plane Γ0; and (2) In the case of the straight welding path A-P-B, a plane including the path A-P-B and corresponding to a representative surface portion of the workpiece is defined as the virtual reference plane Γ0.

In FIG. 4, the reference symbol <n> designates a normal vector of the virtual reference plane Γ0 thus defined, and the reference symbol Γ1 designates a normal plane orthogonally intersecting the virtual reference plane Γ0 along a tangent line of the welding path at the point P.

In this connection, assuming a virtual plane Γ2 that includes both the straight line extending along the extending direction of the welding torch 38 (i.e., the direction of Z-axis of the tool coordinate system) and the tangent of the welding line at the torch tip point 38a, an angle θ defined between the virtual reference plane Γ0 and the virtual plane Γ2 is referred to as the "work angle".

On the other hand, when a line "g" perpendicular to the tangent of the welding line is drawn from the torch tip point 38a on the virtual plane Γ2, an angle φ defined between the perpendicular line "g" and the straight line extending along the extending direction of the welding torch 38 (i.e., the direction of Z-axis of the tool coordinate system) is referred to as the "travel angle". If the illustrated angle φ is less than 0 degrees, although the angle φ may be referred to as a "back angle" in place of the "travel angle", it is consistently referred to as the "travel angle (with a ± sign)" in this specification.

As will be understood from the above, the work angle θ represents an inclination of the welding torch 38 about the welding line with respect to the virtual reference plane Γ0, and the travel angle φ represents an inclination of the welding torch 38 with respect to the perpendicular line "g" orthogonal to the welding line. In the specific example as described below, a welding operation on a generally arcuate welding line along an outer circumferential surface of a generally cylindrical pipe is assumed and, therefore, the virtual reference plane Γ0 is defined according to (1) described above.

Then, with reference to FIGS. 5 to 10, an angle data processing procedure in a data processing apparatus according to an embodiment of the present invention will be described. It is assumed that the data processing apparatus according to this embodiment includes all components of the embodiments shown in FIGS. 2A to 2E set forth above.

Figure 5:
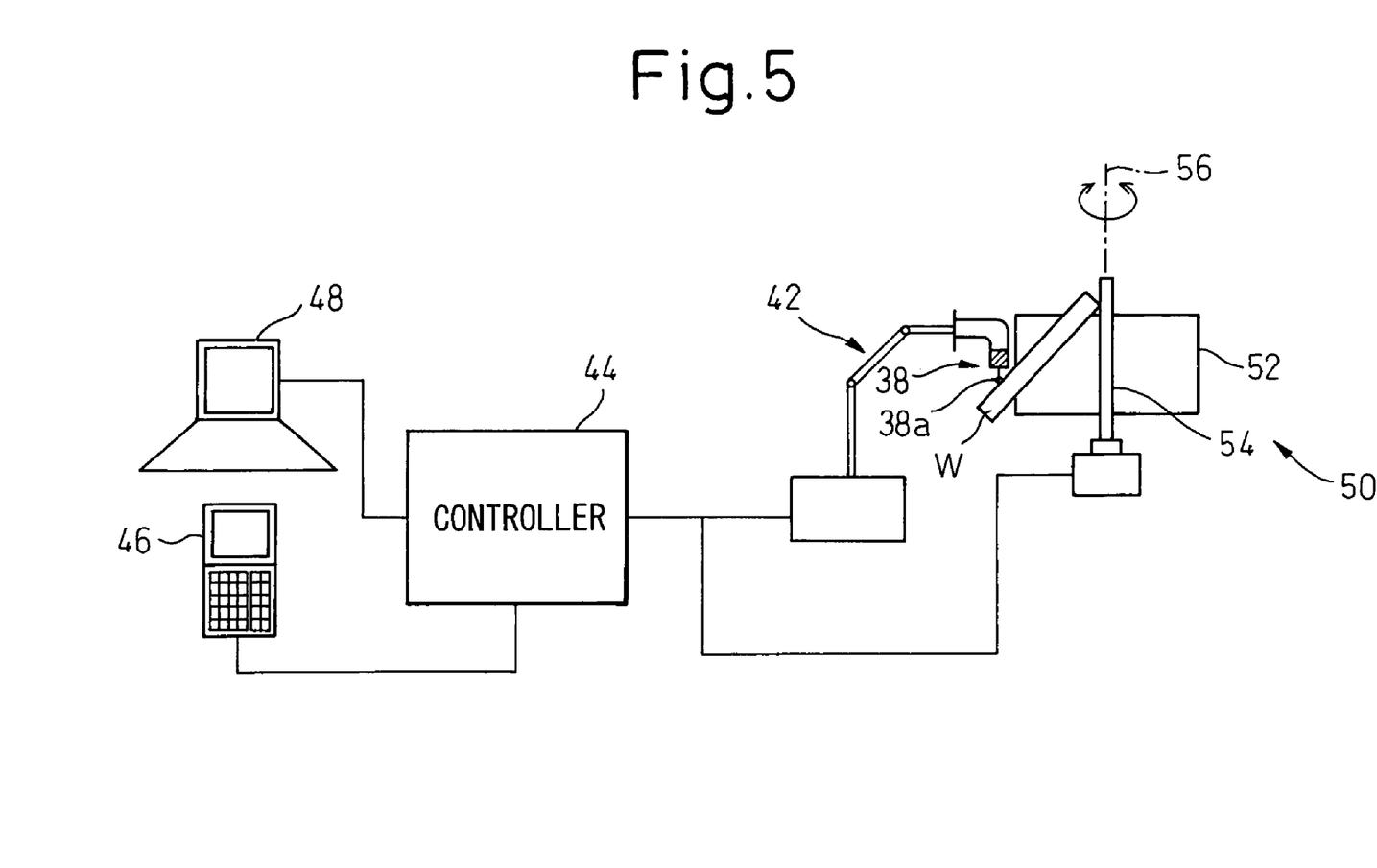
FIG. 5 is a diagram schematically showing an arc welding robot system provided with a data processing apparatus according to an embodiment of the present invention.

FIG. 5 schematically shows the configuration of an arc welding robot system provided with a data processing apparatus according to an embodiment of the present invention. In the illustrated arc welding robot system, an arc welding torch 38 is attached to an arm end portion of a robot (or a mechanical section) 42. The robot 42 is connected to a robot controller 44 through a cable. The robot controller 44 is further connected with a manual teaching panel 46 and a personal computer 48. In this connection, a welding power supply for supplying welding voltage/welding current to the welding torch 38 under the control of the robot controller 44 and a welding-wire feeding mechanism for the welding torch 38 are omitted in the drawing.

In the illustrated embodiment, the welding torch 38 performs an arc welding on a pipelike workpiece W having a cross-sectional shape showing a generally circular outer circumference, with the workpiece W positioned and fixed on a work-table 52 of a positioner 50. The positioner 50 includes a rotating member 54 and a servo motor (not shown) for rotationally driving the rotating member 54 about a rotation axis 56. The positioner 50 is connected to the robot controller 44 and its operation is controlled by the robot controller 44, in the same manner as the robot 42. In the illustrated embodiment, while the pipelike workpiece W is rotated by the positioner 50, the arc welding is performed along a generally arcuate or circular welding line extending over one turn of the outer circumferential surface of the workpiece W.

In the illustrated arc welding robot system, either the robot controller 44 or the personal computer 48 (or a robot simulation apparatus) may be configured as a data processing apparatus according to an embodiment of the present invention. In either case, a welding operation program including position/orientation data for indicating the position and orientation of the robot at the teaching points, speed command data for indicating speed commands, and the like, is prepared.

In the case where the robot controller 44 is used as the data processing apparatus according to the present invention, the welding operation program is prepared within the robot controller 44. This welding operation program may be provided, for example, through a playback teaching by a jog-feed operation as described above.

On the other hand, in the case where the personal computer 48 is used as the data processing apparatus according to the present invention, a work-cell in which the robot 42, the welding torch 38, the positioner 50, the workpiece W and the like, are provided in a corresponding location is defined previously within the personal computer 48. Further, a software used for simulating the operations of the robot 42 and the positioner 50 (both defined virtually in the work-cell) at the time of the execution of the welding operation program is prepared in the personal computer 48. Thus, the personal computer 48 can be used as the robot simulation apparatus.

Figure 6:
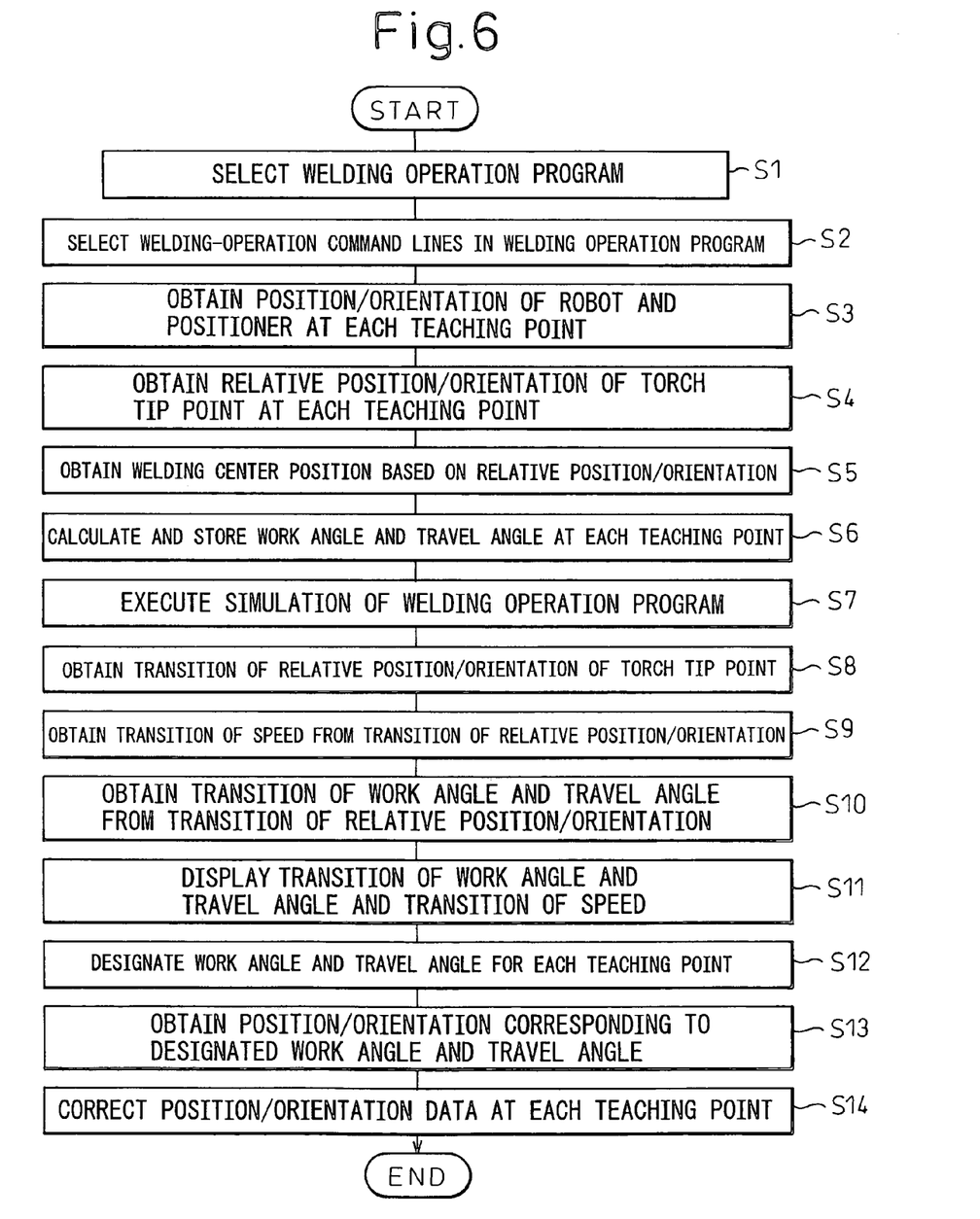
FIG. 6 is a flow chart showing a data processing procedure in the data processing apparatus of FIG. 5.

FIG. 6 shows a data processing procedure in the data processing apparatus according to the illustrated embodiment. In the illustrated data processing procedure, the work angle, travel angle and welding speed are obtained from the welding operation program given to the robot to be displayed, and the welding operation program is then processed to be corrected in accordance with the designation of the desired work and travel angles. This data processing is performed in the robot controller 44 when the robot controller 44 is used as the data processing apparatus and, on the other hand, it is performed in the personal computer 48 when the personal computer 48 is used as the data processing apparatus. Further, in the former case, an LCD provided in the manual teaching panel 46 is employed as a display unit and, in the latter case, an LCD provided in the personal computer 48 is employed as a display unit.

The illustrated flow chart will be described in relation to the respective steps.

Step S1: A welding operation program for displaying the welding conditions (or angle data) for the purpose of confirmation and correction is selected among a plurality of robot programs previously set in the robot 42. The selection of the program may be performed, for example, by an operator in such a manner as to call a list of the robot programs on a display screen and to designate the desired program thereon.

Figures 7A, 7B:
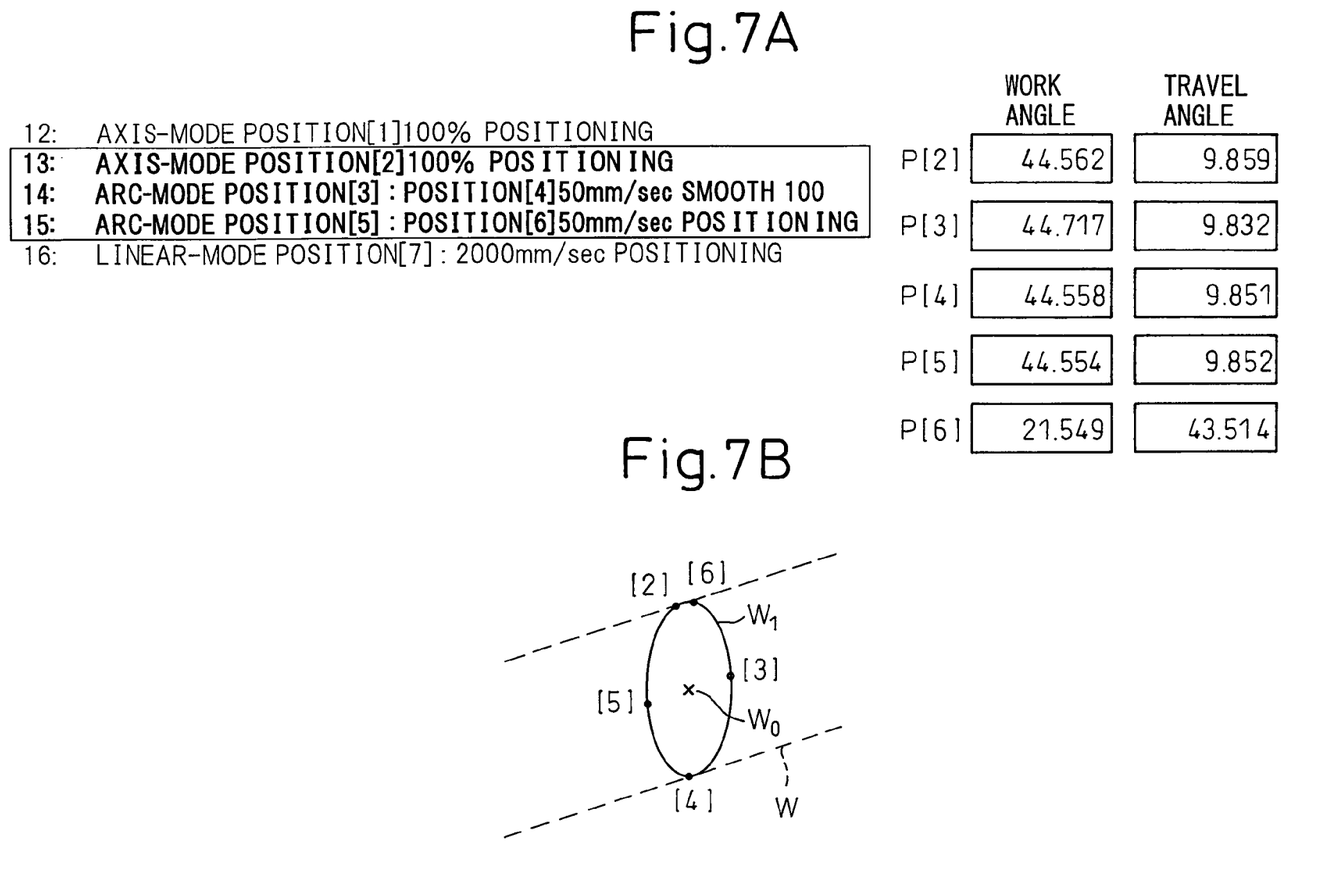
FIG. 7A is a diagram showing an example of a display format for displaying several operation command lines in a welding operation program, selected according to the data processing procedure of FIG. 6, as well as a work angle and a travel angle at teaching points corresponding thereto.
FIG. 7B is a diagram schematically showing, along a profile of a workpiece, the teaching points described in the operation command lines in the welding operation program of FIG. 7A.

Step S2: In the selected welding operation program, command lines for the welding operation are also selected. FIG. 7A shows, by way of example, the welding-operation command lines and other command lines just before and after the welding-operation command lines, in the welding operation program selected in step S1. The 13th to 15th lines, enclosed by a broken line, are the welding-operation command lines. These operation command lines include the instruction of "the positioning at POSITION [2] in respective-axes motion mode (the 13th line), the movement through POSITION [3] to POSITION [4] along the circular and arcuate path defined by POSITION [2] to POSITION [4] (the 14th line), and the movement through POSITION [5] to POSITION [6] along the circular and arcuate path defined by POSITION [4] to POSITION [6] (the 15th line)." In an actual program, a command for turning-on the welding torch is provided, e.g., immediately before the 13th line, but an illustration thereof is omitted in the drawing.

As shown in FIG. 7B, POSITION [2] to POSITION [6], as five teaching points, correspond to five points on one circular arc W1 (having a center W0) along the outer circumference of the pipelike workpiece W, and the position and orientation data for each point (i.e., the data for the robot 42 and the positioner 50) are stored in a memory. In this connection, the positions of POSITION [2] and POSITION [6] are typically close to each other, but the orientations thereof are variously selectable.

As shown in FIG. 7A, it is possible to display the values of the work angles and travel angles at the respective teaching points included in the selected operation command lines on a display screen, in close proximity to the indication of the welding operation program. The angle data is displayed only after step S6 described below is completed, and numerical-value indicating spaces are thus blank (or set to zero) at the above step S2. Actually, the time after the completion of step S2 till the completion of step S6 is very short and, for example, is less than 1 second.

Step S3: The position and orientation data of the robot 42 and the positioner 50 are obtained for each teaching point (i.e., POSITION [2] to POSITION [6]).

Step S4: For each teaching point, the relative position and orientation data of the torch tip point 38a with respect to the workpiece W are obtained in the following manner.

Figure 8:
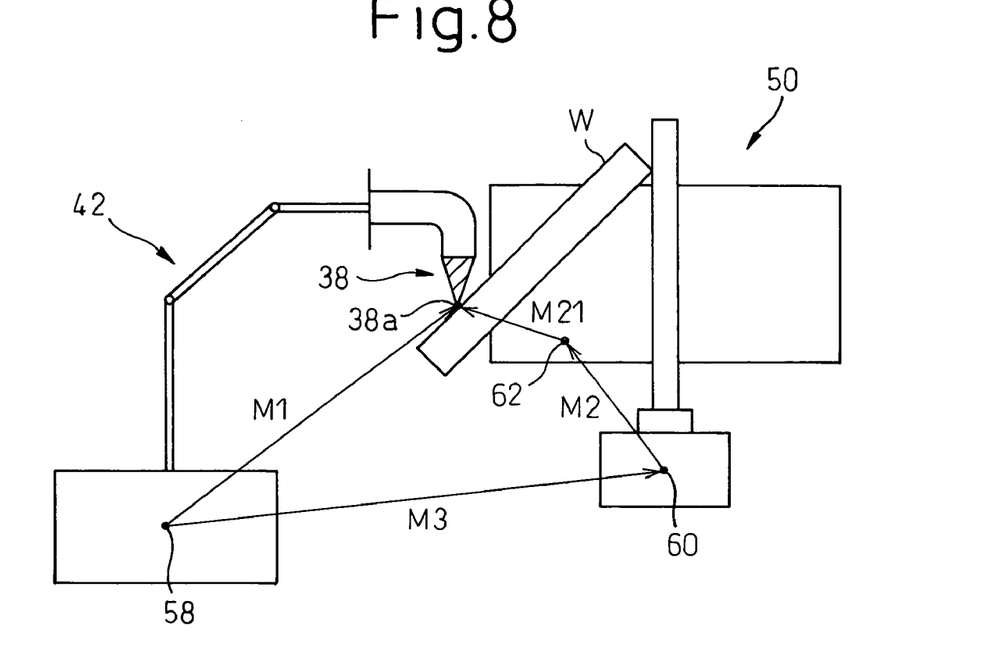
FIG. 8 is a diagram for describing a technique for obtaining relative position data of a welding torch tip point with respect to a workpiece, in the data processing procedure of FIG. 6.

As shown in FIG. 8, a transformation matrix M1 is defined, which provides the transformation from the position/orientation data with respect to a reference point (e.g., the origin of the base coordinate system) 58 of the robot 42 into the position/orientation data with respect to the tip point 38a of the welding torch 38. On the other hand, in the positioner 50, a certain coordinate system (hereinafter referred to as a positioner-base coordinate system) is defined for its driving mechanism, and a certain coordinate system (hereinafter referred to as a positioner-motion representative coordinate system) representative of the operating position of the positioner 50 is defined. Then, a transformation matrix M2 is defined, which provides the transformation from the position/orientation data with respect to a reference point (e.g., the origin of the positioner-base coordinate system) 60 of the positioner 50 into the position/orientation data with respect to the origin 62 of the positioner-motion representative coordinate system. Further, a transformation matrix M3 is defined, which provides the transformation from the position/orientation data with respect to the reference point 58 of the robot 42 into the position/orientation data with respect to the reference point 60 of the positioner 50. Still further, a transformation matrix M21 is defined, which provides the transformation from the position/orientation data with respect to the origin 62 of the positioner-motion representative coordinate system into the position/orientation data with respect to the tip point 38a of the welding torch 38. The matrix M21 is expressed by the following formula:

$$M21 = \text{Inv}(M2) * \text{Inv}(M3) * M1 \text{ (* is the operator of multiplication)}$$

The matrixes M21 for all teaching points in the selected operation command lines are also obtained in the same way.

At this time, each M21 indicates the relative position and the relative orientation, of the tip point 38a of the welding torch 38 with respect to the positioner-motion representative coordinate system of the positioner 50 (i.e., the disposition of the workpiece W) at the corresponding teaching point.

Step S5: Based on the relative position and orientation data obtained in step S4, a welding center point (including the orientation thereof) is obtained by using an elliptic approximation technique as described below.

Generally, a transformation matrix between two different position and orientation data can be expressed in the form of (x, y, z, w, p, r). In this connection, x, y, z represent a relative position and w, p, r represent a relative orientation. In order to obtain the center position of the welding operation, an average plane containing x, y, z of M21 for each teaching point in a three-dimensional space is first obtained. A plane in a three-dimensional space can be expressed by the following general formula:

$$Ax+By+Cz+D=0$$

The vector (A, B, C) described by the above coefficients represents a normal vector of this plane.

Therefore, the normal vector of the plane is calculated from x, y, z of M21 for each teaching point by using Newell's method (Martin Newell, ACM Computing Surveys, Vol. 6, No. 1, March 1974), so as to obtain A, B, C. Then, the A, B, C as obtained and the x, y, z of M21 for each teaching point are substituted into the above general formula for a plane, so as to obtain the values of a plurality of D (constant terms).

Then, a formula for the average plane is determined on the basis of the average value of the plurality of D and the A, B, C mentioned above.

Then, by using a least squares method, an approximation of an ellipse passing through several points obtained as the projections of x, y, z of M21 for each teaching point onto the plane obtained as described above (in other words, several points of intersection between the obtained plane and the perpendicular lines extending from the points represented by x, y, z to the obtained plane).

The center point of the ellipse, obtained as described above, is defined as the center position of the welding operation. The welding center position corresponds to the center W0 of the welding line (i.e., the circular arc W1) shown in FIG. 7B, and lies in the plane containing the plurality of teaching points. In this embodiment, the illustrated plane containing the welding center and the respective teaching points acts as the virtual reference plane Γ0 (FIG. 4) for calculating the work angle and travel angle.

In this connection, based on the above-described center position and the normal vector of the above-described plane, a central coordinate system having the center point as the origin is defined separately. This center coordinate system will be discussed below in the step S6. In the case where the workpiece W is pipelike as in this embodiment, the Z-axis direction of the central coordinate system may, for example, correspond to the longitudinal axis of the pipe.

Step S6: The work angle and travel angle for each teaching point are calculated and stored in a manner described below. In this connection, when step S6 is completed, specific values are displayed in the numerical-value indicating spaces for the work angle and travel angle shown in FIG. 7A.

Figure 9:
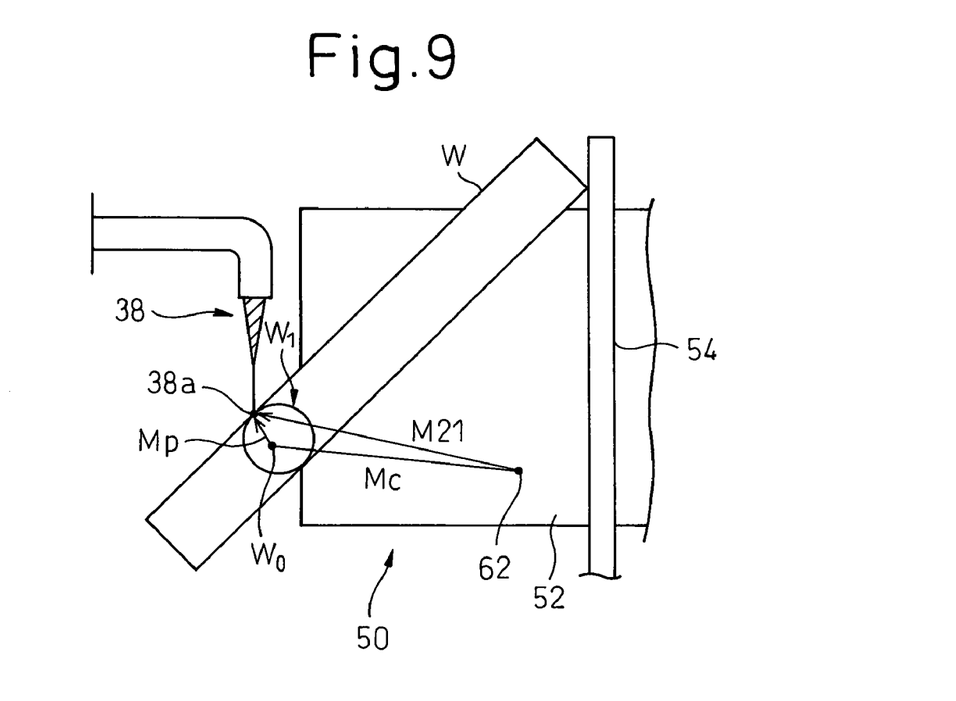
FIG. 9 is a diagram for describing a technique for obtaining a work angle and a travel angle, in the data processing procedure of FIG. 6.

As shown in FIG. 9, a transformation matrix Mc, which provides the transformation from the position/orientation data with respect to a certain point on the positioner 50 (in the drawing, the origin 62 of the positioner-motion representative coordinate system) into the position/orientation data of the above-described central coordinate system, is defined. Also, a transformation matrix Mp, which provides the transformation from the central coordinate system into M21, is defined. Thus, Mp can be expressed by the following formula:

$Mp=\text{Inv}(Mc)*M21$ (* is the operator of multiplication)

In this connection, the x, y, z of Mp represent the position of the torch tip point 38a with respect to the center of the welding operation, and the w, p, r of Mp represent the orientation of the torch tip point 38a with respect to the center of the welding operation. The work angle and travel angle can be calculated by using Mp.

Step S7: The motion simulation of the welding operation program is executed. The simulation is performed in either the robot controller 44 or the personal computer 48 and, even when it is performed in the robot controller 44, the robot 42 and the positioner 50 do not have to be operated actually. During the simulation, the values of positions of respective control axes of the robot 42 and of the positioner 50 (i.e., the position and orientation data) are stored in the memory at a predetermined period (e.g., at an interpolation period), along with the data for elapsed time (i.e., the data representing the period).

Step S8: Data for transition of the relative position and orientation of the torch tip point 38a with respect to the workpiece W are obtained. By using the values for the respective control axes of the robot 42 and positioner 50 at the interpolation period, which are stored together with the data for elapsed time in step S7, it is possible to obtain the data for transition of the relative position and orientation of the torch tip point 38a in a manner similar to that in step S4.

Step S9: Data for transition of a speed are obtained from the data for transition of the relative position and orientation obtained in step S8 in a manner as described below.

The data for transition of the positions and orientations of the robot 42 and positioner 50 during the welding operation are obtained through the simulation in step S7 or the monitoring of the operating state of the robot 42 performed separately. Then, data for transition of the position and orientation of the tip point 38a of the welding torch 38 with respect to the reference position 58 of the robot 42 are obtained from the above transition data by using the technique discussed in step S4. It is possible to obtain the data for transition of the welding speed by dividing the travel of the position of the torch tip point 38a by the elapsed time.

Step S10: Data for transition of the work angle and travel angle are obtained from the data for transition of the relative position and orientation obtained in step S8. The technique for obtaining the transition data of the relative position and orientation is similar to that in step S6.

Figure 10:
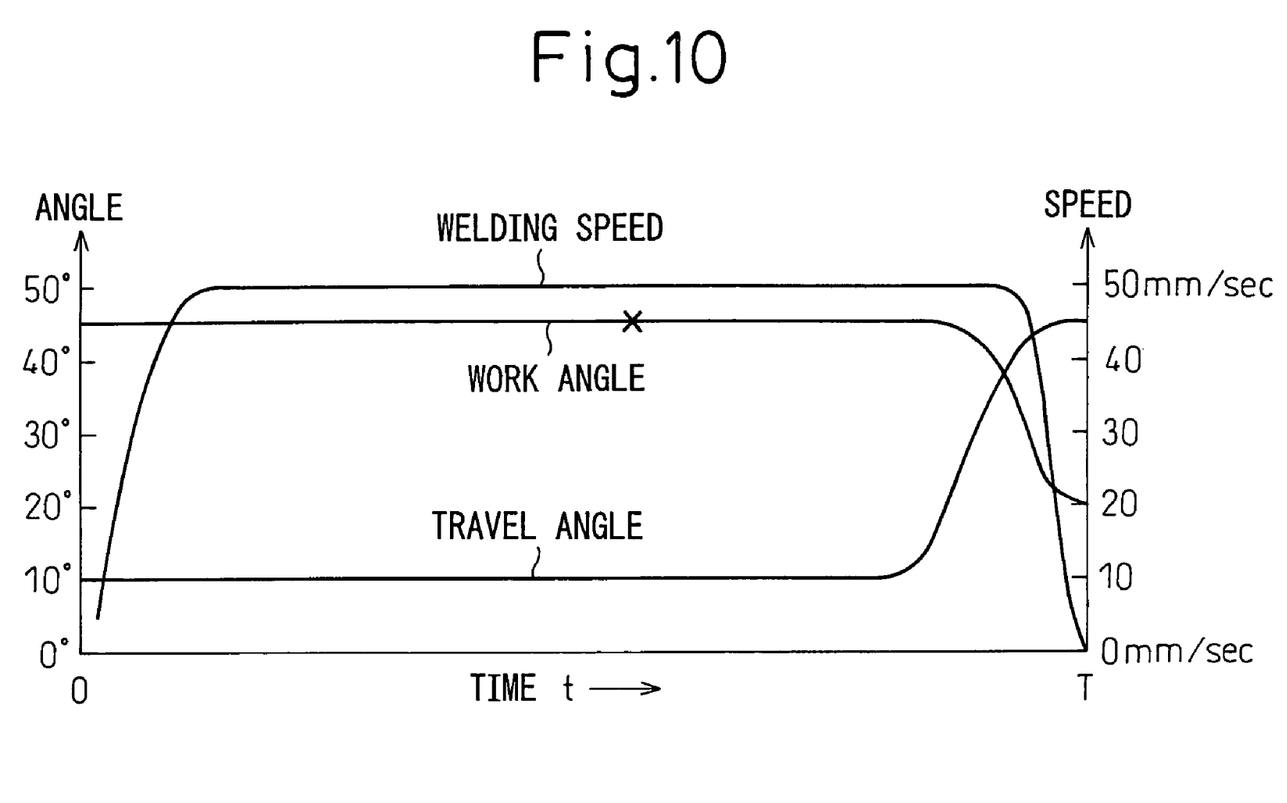
FIG. 10 is diagram showing an example of a graphical representation of a transition of the work angle, the travel angle and a welding speed.

Step S11: The transition of the work angle and travel angle and the transition of the speed are displayed on the display screen. FIG. 10 shows an example of a graphical representation (or a graph of curves) of the transition of the work angle, travel angle and speed. In this graph, the horizontal axis represents an elapsed time axis, wherein t=0 represents the start time of the motion simulation and t=T represents the finish time of the motion simulation. In this connection, when the operator designates a desired point (e.g., shown by "x") on the display screen showing the graph, a command line executed (or simulated) at the time "t" corresponding to the designated point (e.g., any one of the 13th to 15th lines, shown in FIG. 7A) is displayed.

Step S12: The operator designates a desired work angle and a desired travel angle. This designation is performed by the operator in a manner as to input the values of the work angle and travel angle for each teaching point, by using, for example, a keyboard of the manual teaching panel 46 or the personal computer 48. At this time, it is possible to call the value indication spaces of the work angles and travel angles shown in FIG. 7A, so as to rewrite the necessary portions in the indicated values.

Step S13: The position and orientation data corresponding to the designated work angle and travel angle for each teaching point are obtained in a manner as described below.

Mc as well as Mp for each teaching point are obtained in a manner similar to that in the steps S4 to S6. Then, Mp' is calculated by changing the orientation data w, p, r of Mp according to the designated work and travel angle. When the orientation data for the teaching points of the robot 42 is changed to satisfy Mp', the orientation data M1' after correcting the teaching points can be expressed by the following formula:

$M1'=M3*M2*Mc*Mp'$ (* is the operator of multiplication.)

When the respective orientation data of M1' for each teaching point are calculated and the orientations in a plurality of position and orientation data described in the welding operation program are updated or corrected, it is possible to reflect the designation contents on the welding operation program.

Step S14: The position and orientation data for each teaching point are updated or corrected by using the position and orientation data (in particular, the orientation data) obtained in step S13, and thereby the procedure is completed.

Figure 11:
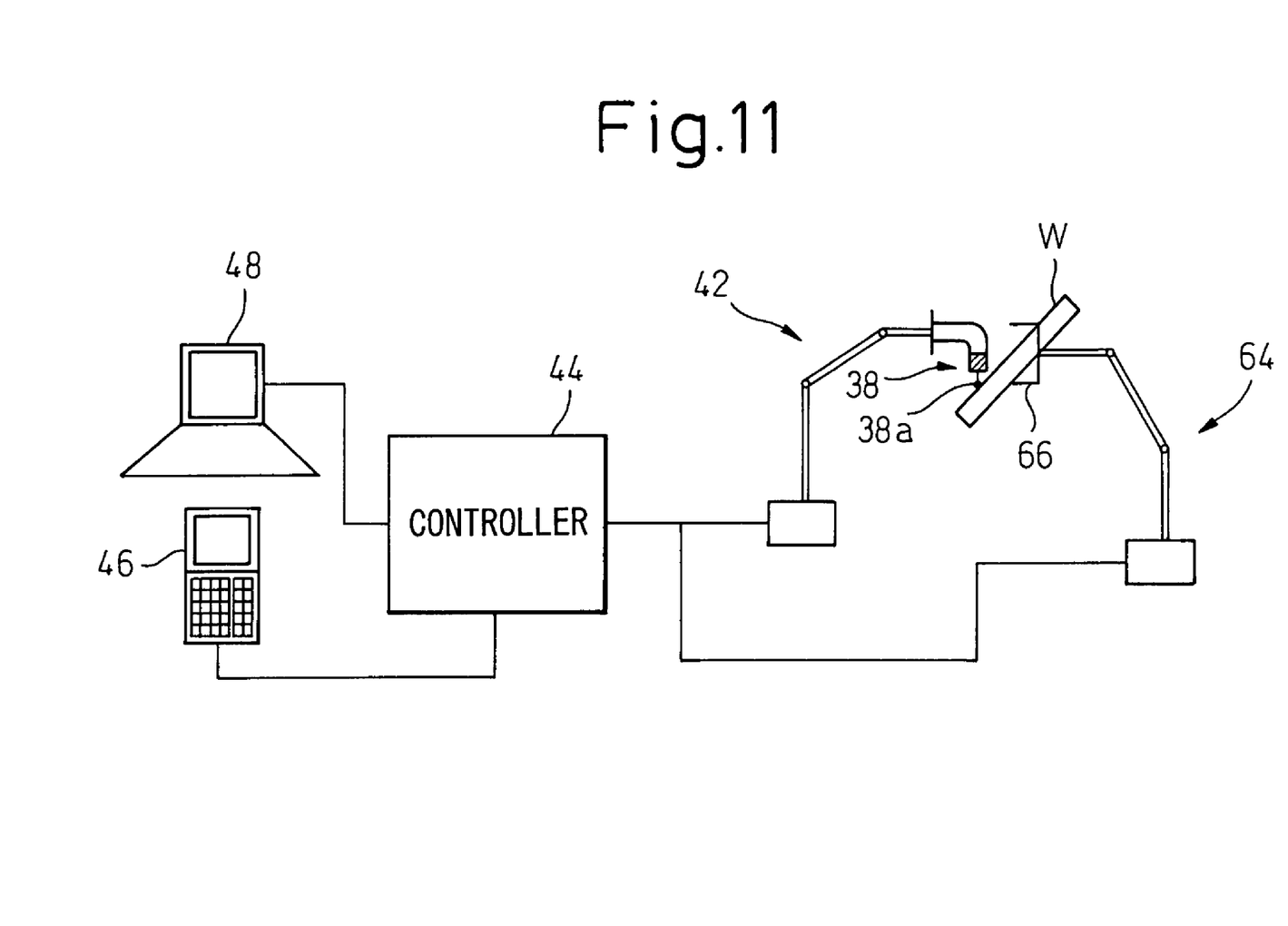
FIG. 11 is a diagram schematically showing a configuration of an arc welding robot system provided with a data processing apparatus according to another embodiment of the present invention, wherein a workpiece support is comprised of a robot.

While the arc welding robot system in connection with the embodiment described above employs the configuration in which the workpiece W is supported by the positioner 50, another configuration may be employed, as shown in FIG. 11, in which the positioner is replaced by a second robot 64 different from the robot 42 to which the welding torch 38 is attached, and the workpiece W is supported by a hand 66 of the robot 64. These two robots 42, 64 can be controlled by the robot controller 44.

This configuration can be treated equivalently to the above-described embodiment using the robot 42 and the positioner 50, by defining a transformation matrix M2 from the position/orientation data with respect to a reference point of the robot 64 (e.g., the origin of the base coordinate system of the robot 64) into the position/orientation data in the tool coordinate system of the robot 64, and a transformation matrix M3 from the position/orientation data with respect to a reference point of the robot 42 (e.g., the origin of the base coordinate system of the robot 42) into the position/orientation data with reference to the reference point of the robot 64, in the step S4 of the flow chart described above.

However, concerning the steps S12 to S14, in order to satisfy the new relative position and orientation data Mp' after correction, the teaching points of the robot 64 moving the workpiece W may be changed in place of the change in the teaching points of the robot 42. In this case, the new teaching point M2' of the robot 64 can be expressed by the following formula:

$$M2' = \text{Inv}(M3) * M1 * \text{Inv}(Mc * Mp')$$

While the invention has been described with reference to specific preferred embodiments, it will be understood by those skilled in the art that various changes and modifications may be made thereto without departing from the spirit and scope of the following claims.

The invention claimed is:

1. A data processing apparatus for processing data described in a welding operation program of an arc welding robot system, said arc welding robot system including a robot with an arc welding torch attached thereto and said welding operation program being previously set in the robot, said data processing apparatus comprising:
a data obtaining section for obtaining a plurality of position and orientation data at a plurality of different teaching points previously taught and included in said welding operation program;
a reference plane setting section for setting a virtual reference plane as a reference defining a geometric placement of an arc welding torch relative to a workpiece during a welding operation, based on said plurality of position and orientation data obtained in said data obtaining section;
an angle calculating section for calculating a plurality of angle data representing said geometric placement of said arc welding torch at every teaching points, by using said plurality of position and orientation data obtained in said data obtaining section and said virtual reference plane set in said reference plane setting section; and
an angle processing section for performing at least one of a displaying process and a correcting process, of said plurality of angle data calculated in said angle calculating section.

2. The data processing apparatus as set forth in claim 1, wherein said angle processing section includes a data display section for displaying said plurality of angle data at said plurality of teaching points.

3. The data processing apparatus as set forth in claim 1, wherein said angle processing section includes a correction instructing section for instructing a correction of desired angle data among said plurality of angle data; and a data correcting section for correcting, according to an instruction of said correction instructing section, position and orientation data corresponding to said desired angle data instructed in said correction instructing section among said plurality of position and orientation data obtained in said data obtaining section.

4. The data processing apparatus as set forth in claim 1, further comprising a simulating section for simulating said welding operation program; wherein said data obtaining section obtains said plurality of position and orientation data at a predetermined period during a simulation of said welding operation program in said simulating section; and wherein said angle calculating section calculates said plurality of angle data at said predetermined period by using said plurality of position and orientation data obtained at said predetermined period in said data obtaining section and said virtual reference plane.

5. The data processing apparatus as set forth in claim 4, wherein said angle processing section includes a data display section for displaying, graphically along a time axis, said plurality of angle data calculated in said angle calculating section at said predetermined period.

6. The data processing apparatus as set forth in claim 5, wherein said data display section receives a time indication indicating a desired portion, along said time axis, of said plurality of angle data as displayed graphically, and displays contents of description of said welding operation program corresponding to said desired portion indicated by said time indication.

7. The data processing apparatus as set forth in claim 4, further comprising a speed calculating section for calculating a moving speed of said arc welding torch relative to the workpiece during the welding operation, based on said plurality of position and orientation data obtained in said data obtaining section at said predetermined period and time data representing said predetermined period, and a speed display section for displaying, graphically along a time axis, said moving speed calculated in said speed calculating section.

8. The data processing apparatus as set forth in claim 1, wherein said arc welding robot system includes a robot, to which said arc welding torch is attached, and a workpiece support for supporting said workpiece; and wherein said welding operation program comprises a program for controlling an operation of at least one of said robot and said workpiece support.

9. The data processing apparatus as set forth in claim 1, wherein each of said plurality of angle data includes a work angle of said arc welding torch.

10. The data processing apparatus as set forth in claim 1, wherein each of said plurality of angle data includes a travel angle of said arc welding torch.

* * * * *